Figure 1:
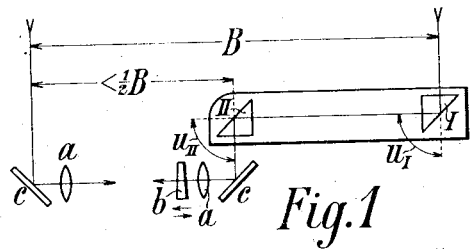

R. STÜTZER.
TELEMETER.
APPLICATION FILED JAN. 20, 1913.

1,100,850.

Patented June 23, 1914.
2 SHEETS—SHEET 1.

Witnesses:

Inventor:
Rudolf Stützer

UNITED STATES PATENT OFFICE.

RUDOLF STÜTZER, OF JENA, GERMANY, ASSIGNOR TO THE FIRM OF CARL ZEISS, OF JENA, GERMANY.

TELEMETER.

1,100,850.

Specification of Letters Patent. Patented June 23, 1914.

Application filed January 20, 1913. Serial No. 743,231.

*To all whom it may concern:*

Be it known that I, RUDOLF STÜTZER, a citizen of the German Empire, residing at Jena, Germany, have invented a new and useful Telemeter, of which the following is a specification.

The invention relates to a further development of the telemeter described in the specification Serial No. 712,347 and covered therein by claim 2. If for such an instrument the further condition be made, that in the adjusting disposition the entering axial rays shall be directed in the same sense as in the measuring disposition, its arrangement for transforming the measuring disposition into the adjusting disposition and vice versa is capable of being considerably simplified, not, however, without an advantage of the hitherto existing arrangement being lost. Hitherto the contingent error of reflection appeared in the adjusting disposition with the same sign as in the measuring disposition, so that it neutralized itself as it were, because the compensation, which had been brought about in the adjusting disposition, acted in the same way in the measuring disposition.

With the arrangement according to the present invention the error of reflection in the other disposition has certainly still the same absolute value, but the opposite sign, to what it has in the one, so that, when compensated in the one disposition, it takes effect doubly in the other, viz. besides through the reflecting system also through the compensating means employed in the first disposition. This double error will probably generally speaking be too great to be negligible. As long, however, as the error of reflection can be taken as being invariable, the adjusting disposition retains its value as a means for testing, whether the telemeter has retained the correct adjustment. With the arrangement according to the present invention, however, the range indication, which presents itself in the adjusting disposition after coincidence has been brought about for an object at any chosen range, as long as the adjustment has remained undisturbed, and which must otherwise be reëstablished during readjustment (by a relative displacement of scale and index), is not infinity (as when, contrary to the above assumption, the error of reflection is zero). This adjusting indication is on the contrary dependent on the error of reflection and is presented according to the sign of the latter by a point of the scale before or behind infinity. It must be ascertained, when the telemeter is being made. Should it be desired in spite of the finite error of reflection to employ the convenient adjusting indication infinity, a compensator may be made use of, when the instrument is being made, which is so disposed as to influence the relative position of the images only in one of the two dispositions of the reflecting system.

By reason of the new arrangement, for changing from one disposition to the other and vice versa the reflecting system is only so moved that its axis of incidence remains parallel to itself on such movement taking place. The simplest cases of such a movement are that one, in which the reflecting system is rotated by approximately 180° in a plane parallel to the base-line and perpendicular to the sighting plane, and that one, in which it is displaced parallel to the base-line. When the reflecting system produces a displacement of both entering axial rays, each of the two reflecting part-systems is to be made independently movable in the manner indicated.

Figure 2:
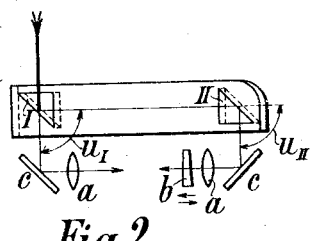
Figure 3:
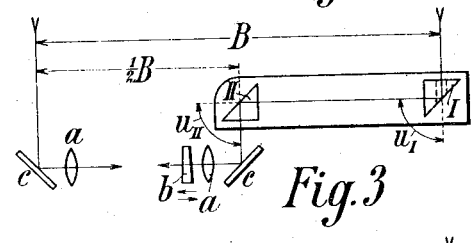
Figure 4:
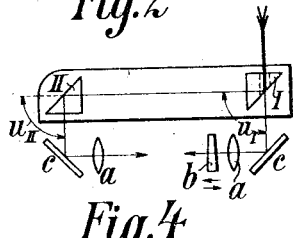
Figure 5:
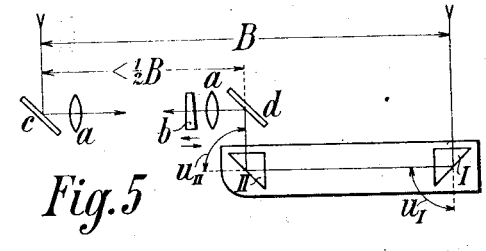
Figure 6:
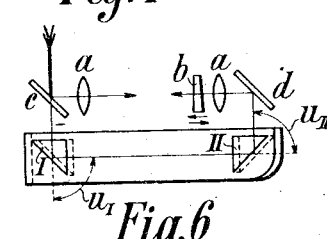
Figure 7:
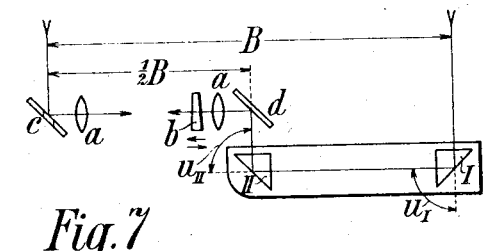
Figure 8:
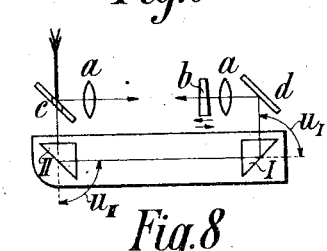
Figure 9:
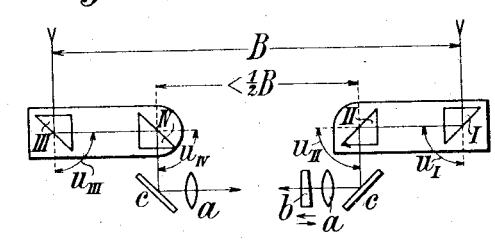
Figure 10:
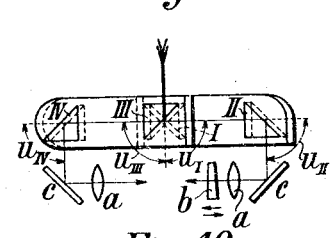
Figure 11:
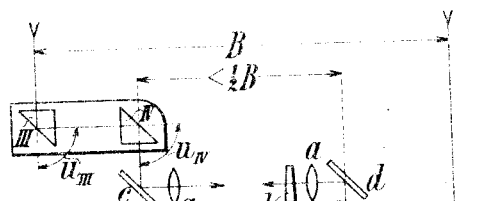
Figure 12:
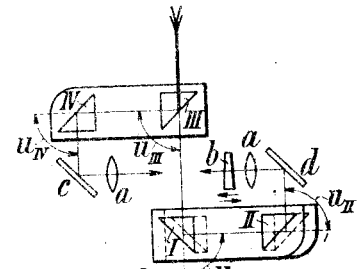
Figure 13:
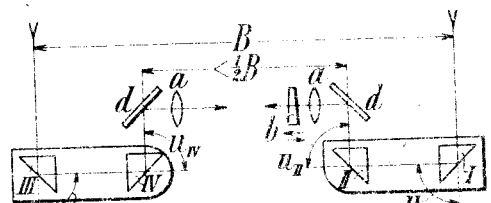
Figure 14:
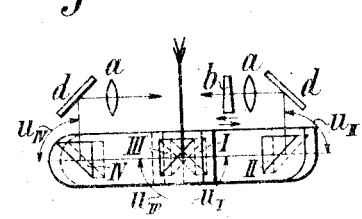
Figure 15:
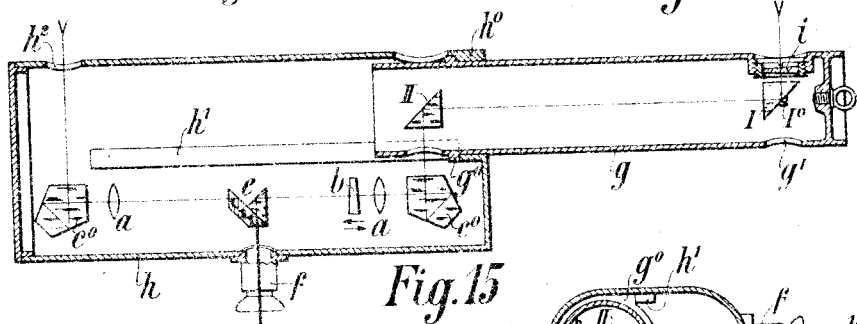
Figures 16, 17:
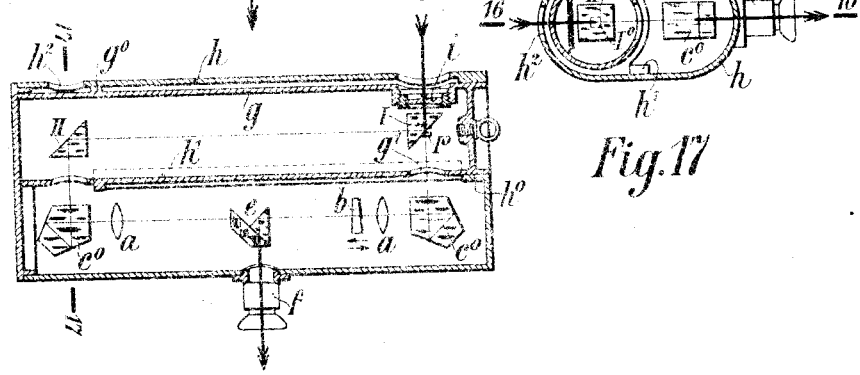

In the annexed drawing: Figures 1 and 2 are diagrammatic plan views of one form of the telemeter according to the invention in the measuring and in the adjusting dispositions respectively. Figs. 3 and 4 are similar views of a second form of the telemeter. Figs. 5 and 6 are similar views of a third form of the telemeter. Figs. 7 and 8 are similar views of a fourth form of the telemeter. Figs. 9 and 10 are similar views of a fifth form of the telemeter. Figs. 11 and 12 are similar views of a sixth form of the telemeter. Figs. 13 and 14 are similar views of a seventh form of the telemeter. Fig. 15 is a horizontal axial section through a constructional example of the telemeter according to the invention in the measuring disposition. Fig. 16 is a similar view of the instrument in the adjusting disposition. Fig. 17 is a section on line 17—17 of Fig. 16.

In Figs. 1 to 14, of the part of the telemeter lying behind the reflecting system only the objectives $a$, a displaceable refracting prism $b$ representing the measuring device and the objective reflectors $c$ (and $d$ respectively) are shown. It should, however, be mentioned, that in the choice of the ocular system regard must be had for the position of the reflecting system in the adjusting disposition. Thus in the example Figs. 7 and 8 a downward direction of inspection is to be assumed.

From the measuring dispositions according to Figs. 1 and 3 the corresponding adjusting dispositions are derived, in Fig. 2 by rotating the reflecting system I, II about the axial ray emerging from it, in Fig. 4 by displacing the reflecting system I, II.

From the measuring dispositions according to Figs. 5 and 7 the corresponding adjusting dispositions are derived, in Fig. 6 by rotating the reflecting systems I, II about the emerging axial ray, in Fig. 8 by displacing the reflecting system I, II.

From the measuring dispositions according to Figs. 9 and 11 the corresponding adjusting dispositions according to Figs. 10 and 12 are in either case derived by rotating the two reflecting part-systems I, II and III, IV about the emerging axial rays.

From the measuring disposition according to Fig. 13 the corresponding adjusting disposition according to Fig. 14 is derived by rotating the two reflecting part-systems I, II and III, IV about the emerging axial rays.

As explained in the specification No. 712,347 in the reflecting systems in place of the simple reflecting prisms rigidly connected together in pairs optical square prisms may also be employed and in Figs. 5, 7, 11 and 13 one of the prisms of each pair of simple prisms can be provided with a ridge-surface, in order to give to this pair of prisms the property of a central reflector.

It remains to be shown, that in both forms of the new arrangement, on the reflecting system or its part-systems being rotated and on their being displaced, with the change of the disposition the sign of the error of reflection also changes. For this purpose the deflection in the clockwise direction shall be reckoned as positive and by R and L shall be understood the respective algebraic sum of all deflections, which the axial ray passing through the right-hand and left-hand objective respectively experiences through the reflecting system. The difference R—L shall then be taken as representing the error of reflection.

In the measuring disposition according to Figs. 1 and 3 $R = u_I - u_{II}$, $L = 0$, the error $R - L = u_I - u_{II}$. In the adjusting disposition according to Fig. 2 $R = -u_I + u_{II}$, $L = 0$, the error $R - L = u_{II} - u_I$. In the adjusting disposition according to Fig. 4 $R = 0$, $L = u_I - u_{II}$, the error $R - L = u_{II} - u_I$.

In the measuring disposition according to Figs. 5 and 7 $R = u_I + u_{II}$, $L = 0$, the error $R - L = u_I + u_{II}$. In the adjusting disposition according to Fig. 6 $R = -u_I - u_{II}$, $L = 0$, the error $R - L = u_I + u_{II}$. In the adjusting disposition according to Fig. 8 $R = -u_{II}$, $L = 0$, the error $R - L = -(u_I + u_{II})$.

In the measuring disposition according to Fig. 9 $R = u_I - u_{II}$, $L = -u_{III} + u_{IV}$, the error $R - L = u_I - u_{II} + u_{III} - u_{IV}$. In the adjusting disposition according to Fig. 10 $R = -u_I + u_{II}$, $L = u_{III} - u_{IV}$, the error $R - L = -u_I + u_{II} - u_{III} + u_{IV}$.

In the measuring disposition according to Fig. 11 $R = u_I + u_{II}$, $L = -u_{III} + u_{IV}$, the error $R - L = u_I + u_{II} + u_{III} - u_{IV}$. In the adjusting disposition according to Fig. 12 $R = -u_I - u_{II}$, $L = u_{III} - u_{IV}$, the error $R - L = -(u_I + u_{II} + u_{III}) + u_{IV}$.

In the measuring disposition according to Fig. 13 $R = u_I + u_{II}$, $L = -(u_{III} + u_{IV})$, the error $R - L = u_I + u_{II} + u_{III} + u_{IV}$. In the adjusting disposition according to Fig. 14 $R = -(u_I + u_{II})$, $L = u_{III} + u_{IV}$, the error $R - L = -(u_I + u_{II} + u_{III} + u_{IV})$.

In Figs. 15 to 17 the transition from the measuring to the adjusting disposition and vice versa is produced by displacing the reflecting system. The optical system according to Figs. 3 and 4 is employed, the reflectors $c$ being replaced by optical square prisms $c^\circ$ and a suitable separating prism as well as an ocular $f$ being added, for a coincidence telemeter, of the two images of which that belonging to the left-hand end of the base-line is erect, that belonging to the right-hand end upside down. The reflecting system I, II is non-rotatably guided with its cylindrical casing $g$ in the bushing $h^\circ$ of the main casing $h$ and with its flange $g^\circ$ in this main casing and on the longitudinal ribs $h^1$ of the latter. To the reflecting prism I is cemented a smaller one $I^\circ$, which allows a part of the rays received by I to emerge again as through a plane-parallel plate. These rays passing through the double prism I, $I^\circ$ without final deflection are received in the adjusting disposition according to Fig. 16 by the right-hand pentagonal prism $c^\circ$. A refracting prism $i$ rotatably fitted in the casing $g$ in front of the reflecting prism I, e. g., as shown in the drawing, journaled by means of a screw thread. It serves in the following manner as the abovementioned compensator. In the last stage of the manufacture of the telemeter first of all in the adjusting disposition, Fig. 16, coincidence is obtained by means of the measuring device $b$ for an object at any given distance and the indicating device corrected, if it does not already indicate infinity. The error of reflection inherent in the reflecting system I, II is now compensated by an equally great, but opposite error, which, e. g., is owing to the position of the measuring device $b$. On changing to the measuring disposition, Fig. 15, the error of reflection acts, as has been shown above in the case of the example Figs. 3 and 4, in the opposite sense, i. e. it adds itself to the equally great error owing to the position of b. In order to remove this double error, an object of known range or an equivalent means of adjustment is required. The measuring device b is then shifted, until the said well-known range is indicated. When this range is infinitely great, naturally the position of b, brought about in the adjusting disposition, obtains along with the corrected indication infinity. Thereupon the compensator-prism i is rotated, until coincidence is obtained for the above-mentioned object, by which means the adjustment is completed. Having been brought back into the adjusting disposition and, if necessary, to the indication infinity, the telemeter again produces coincidence for objects at any given range, because the alteration, which has come about in the setting of the compensator i as compared with its former setting, acts in the adjusting disposition on both entering axial rays in the same manner. Every time the adjusting disposition is used again with the setting infinity, therefore, the occurrence of coincidence is a sign, that the adjustment of the instrument still obtains. The described method during the manufacture of the telemeter and the described mode of checking the adjustment remain unchanged, if the compensator i be disposed in the opening h² of the principal casing. In this location as well it is effective only in the measuring disposition, not in the adjusting disposition.

The compensator i might be fitted also in the opening g¹. It then acts only in the adjusting disposition, not in the measuring disposition. Correspondingly, the procedure during the manufacture of the instrument is such, that coincidence is obtained in the measuring disposition for an object of known range by setting the measuring device b, and that thereupon the indication is caused to tally with the actual range. Thereupon on changing to the adjusting disposition, the setting of the measuring device b is altered, until the range infinity is indicated. Finally the compensator i is adjusted, until coincidence is obtained for any given object.

In order to complete, in spite of a considerable error of reflection, the manufacture of the telemeter without a compensator, at the same time, however, not making use of the adjusting indication infinity, the procedure is in the first place in the measuring disposition the same as that just described, where the compensator is placed in g¹. After passing to the adjusting disposition coincidence for the object, whose range is to be found, is obtained by again setting the measuring device b. The indication of the range so obtained (relative position of the index and the scale) must each time be established, when the adjustment is being verified. The said indication in this case, therefore, takes as adjusting indication the place of the indication infinity.

I claim:

1. In a telemeter, the optical parts of which comprise two telescope systems and a reflecting system consisting of an even number of members, which are connected together rigidly in pairs, a base-line within the instrument, adapted to be divided into two component parts, means for altering the position of the optical system appertaining to one such part relatively to that appertaining to the other, these means comprising a connection between the two said parts, one such pair of members of the said reflecting system being movable relatively to the said telescope systems, whereby the said reflecting system is adapted to assume two dispositions, a measuring disposition and an adjusting disposition, the said reflecting system in its measuring disposition being adapted to bring the two axial rays, which on entering the telemeter have a distance between them in the sighting plane equal to the length of the said base-line, closer together in the said plane by a half of the said length, the direction of which entering axial rays in the adjusting disposition is parallel to that of the entering axial rays in the measuring disposition, that axial ray, which enters the said movable pair of members, remaining parallel to itself during the said movement of the said one pair of members relatively to the telescope systems, the error of reflection with the adjusting disposition having the same value and the opposite sign as that with the measuring disposition, and, with the adjusting disposition, the distance apart of the two entering axial rays in the sighting plane being zero.

2. In a telemeter, the optical parts of which comprise two telescope systems and a reflecting system consisting of an even number of members, which are connected together rigidly in pairs, a base-line within the instrument, adapted to be divided into two component parts, means for altering the position of the optical system appertaining to one such part relatively to that appertaining to the other, these means comprising a connection between the two said parts, one such pair of members of the said reflecting system being movable relatively to the said telescope systems, whereby the said reflecting system is adapted to assume two dispositions, a measuring disposition and an adjusting disposition, the said reflecting system in its measuring disposition being adapted to bring the two axial rays, which on entering the telemeter have a distance between them in the sighting plane equal to the length of the said base-line, closer together in the said plane by a half of the said length, the direction of which entering axial rays in the adjusting disposition is parallel to that of the entering axial rays in the measuring disposition, that axial ray, which enters the said movable pair of members, remaining parallel to itself during the said movement of the said one pair of members relatively to the telescope systems, the error of reflection with the adjusting disposition having the same value and the opposite sign as that with the measuring disposition, and, with the adjusting disposition, the distance apart of the two entering axial rays in the sighting plane being zero, and a compensator being fitted in such a manner as to influence the relative position of the said images only in one disposition of the said reflecting system.

RUDOLF STÜTZER.

Witnesses:
 PAUL KRÜGER,
 RICHARD HAHN.